United States Patent

Azuma et al.

[11] Patent Number: 5,955,524
[45] Date of Patent: Sep. 21, 1999

[54] POLYPROPYLENE RESIN COMPOSITION

[75] Inventors: Yutaka Azuma; Satoshi Tamura, both of Ichihara; Tsunenosuke Hiramatsu, Hatogaya; Keigo Umemoto, Yokohama; Toshio Kano, Sagamihara; Masamichi Kondo, Ageo, all of Japan

[73] Assignee: Idemitsu Petrochemical Co., Ltd., Tokyo, Japan

[21] Appl. No.: 08/651,642

[22] Filed: May 22, 1996

[30] Foreign Application Priority Data

May 25, 1995 [JP] Japan .................................. 7-126118
Jun. 7, 1995 [JP] Japan .................................. 7-140743

[51] Int. Cl.$^6$ ...................................................... C08J 5/00
[52] U.S. Cl. .......................... 524/178; 524/232; 524/310; 524/317; 524/318; 524/394; 524/398; 524/399; 524/400
[58] Field of Search .................................... 524/399, 178, 524/232, 310, 317, 318, 394, 398, 400

[56] References Cited

U.S. PATENT DOCUMENTS

| 4,268,552 | 5/1981 | Duvdevani et al. | 428/31 |
| 5,216,056 | 6/1993 | Suhoza | 524/202 |

FOREIGN PATENT DOCUMENTS

| 857357 | 12/1970 | Canada . |
| 0 114 391 | 8/1984 | European Pat. Off. . |
| 0 249 342 | 12/1987 | European Pat. Off. . |

OTHER PUBLICATIONS

Database WPI, Derwent Publications, AM–91–257266, JP–A–03–168238, Jul. 22, 1991.
Database WPI, Derwent Publications, AM–95–102012, JP–A–07–026077, Jan. 27, 1995.

*Primary Examiner*—Peter D. Mulcahy
*Attorney, Agent, or Firm*—Oblon, Spivak, McClelland, Maier & Neustadt, P.C.

[57] ABSTRACT

A polypropylene resin composition is herein disclosed which is obtainable by blending (A) 100 parts by weight of a polypropylene resin comprising (a) 100 to 20% by weight of a homopolymer of propylene and/or a propylene copolymer containing 4% by weight or less of another olefin unit in which in a pentad fraction by $^{13}$C-NMR, [rrrr/(1-mmmm)]×100 is in the range of 20 to 60%, a Tm measured by a DSC is 150° C. or more, and a melt enthalpy is 100 J/g or less, and (b) 0 to 80% by weight of a propylene copolymer containing 10 to 80% by weight of an olefin unit other than propylene, with (B) 0.01 to 5 parts by weight of an octyltin salt of a fatty acid, an alkylenebisfatty acid amide, a fatty acid ester of a polyvalent alcohol, or a metal salt of an aliphatic monocarboxylic acid.

The employment of this polypropylene resin composition permits, under a good moldability by the calender molding machine, the manufacture of films and sheets having less thickness unevenness, excellent appearance and heat resistance and such flexibility as in molded articles of a plastic polyvinyl chloride.

9 Claims, No Drawings

POLYPROPYLENE RESIN COMPOSITION

BACKGROUND OF THE INVENTION (i) Field of the Invention

The present invention relates to a polypropylene resin composition, and more specifically, it relates to a polypropylene resin composition from which there can be manufactured, under a good moldability by a calender molding machine, films or sheets which have less thickness unevenness, excellent appearance and heat resistance and such flexibility as in molded articles of a plastic polyvinyl chloride and which are useful as civil engineering construction materials and automobile interior covering materials.

(ii) Description of the Related Art

A calender molding method is a technique in which a resin composition is rolled between two rolls to continuously form films or sheets having a constant thickness, and it has some advantages. For example, the production power of the calender molding method is higher as compared with that of a usual extrusion molding method, and so the films or the sheets can be supplied at low costs in large quantities to markets. In addition, the thickness precision of the obtained films or sheets is high, and therefore winding wrinkles scarcely occur on the sheets.

Heretofore, a large number of leathers, sheets, films and the like have been manufactured from a plasticized polyvinyl chloride by the use of the above-mentioned calender molding method, but in recent years, it has been demanded to use another material in place of the plasticized polyvinyl chloride owing to a problem of the poison of a plasticizer and a problem of the generation of a harmful gas at the time of the combustion of wastes.

On the other hand, polyolefin resins such as polyethylene and polypropylene do not have the above-mentioned problems and are excellent in physical and chemical characteristics, and therefore they have been used in a wide variety of fields. However, these resins do not have such flexibility as in the plasticized polyvinyl chloride, and when they are molded by the calender molding method, thickness unevenness occurs in the obtained sheets or films. In addition, these resins have another drawback that if the selection of a lubricant to be added is mistaken, plate-out takes place on the surfaces of calender rolls and the discharge of the lubricant (a blooming phenomenon or a bleeding phenomenon) occurs on the surfaces of the molded articles.

Furthermore, a material for calender molding in which a polyolefin resin is used has been disclosed (Japanese Patent Application Laid-open No. 26077/1995), but the basic resin of this material is a usual ethylene-propylene copolymer rubber. Accordingly, it has a drawback that heat resistance is low.

SUMMARY OF THE INVENTION

The present invention has been made under such circumstances, and an object of the present invention is to provide a polypropylene resin composition from which there can be manufactured, under a good moldability by a calender molding machine, films or sheets which have less thickness unevenness, excellent appearance and heat resistance and such flexibility as in molded articles of a plastic polyvinyl chloride and which are useful as civil engineering construction materials and automobile interior covering materials.

The present inventors have intensively researched with the intention of developing a polypropylene resin composition having the above-mentioned preferable characteristics, and as a result, it has been found that a composition obtained by blending a specific polypropylene resin with a specific fatty acid derivative in a predetermined ratio can achieve the above-mentioned object. In consequence, the present invention has been completed on the basis of this knowledge.

That is to say, the present invention is directed to a polypropylene resin composition which is obtainable by blending (A) 100 parts by weight of a polypropylene resin comprising (a) 100 to 20% by weight of a homopolymer of propylene and/or a propylene copolymer containing 4% by weight or less of another olefin unit in which (i) in a pentad fraction by an isotope carbon nuclear magnetic resonance spectrum ($^{13}$C-NMR), [rrrr/(1-mmmm)]×100 is in the range of 20 to 60%, (ii) a melt peak temperature (Tm) measured by a differential scanning calorimeter (DSC) is 150° C. or more, and (iii) a melt enthalpy (ΔH) measured by DSC is 100 J/g or less, and (b) 0 to 80% by weight of a propylene copolymer containing 10 to 80% by weight of an olefin unit other than propylene, with (B) 0.01 to 5 parts by weight of at least one fatty acid derivative selected from the group consisting of octyltin salts of fatty acids, alkylenebisfatty acid amides, fatty acid esters of polyvalent alcohols, and metal salts of aliphatic monocarboxylic acids.

PREFERRED EMBODIMENTS OF THE INVENTION

In a composition of the present invention, as the basic resin of a component (A), there may be used (a) a homopolymer of propylene and/or a propylene copolymer containing 4% by weight or less of another olefin unit, or a polypropylene resin comprising this component (a) and a propylene copolymer (b) containing 10 to 80% by weight of an olefin unit other than propylene.

In the present invention, the homopolymer of propylene and the propylene copolymer containing 4% by weight or less of the other olefin unit which are the components (a) are each required to have characteristics shown in the following (i) to (iii).

In the first place, (i) in a pentad fraction by an isotope carbon nuclear magnetic resonance spectrum ($^{13}$C-NMR), [rrrr/(1-mmmm)]×100 is required to be in the range of 20 to 60%. If this value is less than 20%, heat resistance is poor, and if it is more than 60%, flexibility is insufficient. From these viewpoints, the preferable values of [rrrr/(1-mmmm)]× 100 are in the range of 25 to 55%. Here, the rrrr means a stereostructure where 5 methyl groups which are side chains are positioned in alternately opposite directions to a main chain of carbon-carbon bonds comprising optionally continuous 5 propylene units, or it means a ratio of this stereostructure. The mmmm means a stereostructure where 5 methyl groups which are the side chains are all positioned in one direction to the main chain of the carbon-carbon bonds comprising the optionally continuous 5 propylene units, or it means a ratio of this stereostructure.

The value of [rrrr/(1-mmmm)]×100 can be measured in the following manner. That is to say, $^{13}$C-NMR is measured under conditions of a measurement mode=a proton complete decoupling method, a pulse width=6.9 μs (45°), a pulse-repetition period=3 sec. a cumulative frequency=10000 times, a solvent=1,2,4-trichlorobenzene/heavy benzene (90/ 10 by volume %), a sample concentration=250 mg/2.5 ml of the solvent, a measurement temperature=130° C. by the use of JNM-FX-200 (JEOL, Ltd., $^{13}$C-nuclear resonance frequency=50.1 MHz), and a pentad fraction is then measured on the basis of a difference of a chemical shift due to the steric regularity of a methyl group, i.e., an area intensity ratio between peaks of mmmm to mrrm which appear in a region of 22.5 to 19.5 ppm. Then, the value of [rrrr/(1−mmmm)]×100 is calculated, using the measured pentad fraction.

mmmm: 21.86 ppm
mmmr: 21.62 ppm
mmrr: 21.08 ppm
mmrm+rrmr: 20.89 ppm
rrrr: 20.36 ppm
mrrm: 19.97 ppm Next, (ii) a melt peak temperature (Tm) measured by a differential scanning calorimeter (DSC) is required to be 150° C. or more. If the Tm is less than 150° C., the sufficient heat resistance cannot be obtained. This Tm is usually in the range of 150 to 165° C. In this connection, the Tm is a temperature at a melt peak measured in accordance with JIS K-7121 by the use of DSC-7 made by Perkin-Elmer Co., Ltd.

In addition, (iii) a melt enthalpy (ΔH) measured by DSC is required to be 100 J/g or less. If this ΔH is in excess of 100 J/g, the flexibility of products is impaired, so that the object of the present invention cannot be achieved. This ΔH is usually in the range of 20 to 100 J/g. Incidentally, the ΔH is a value measured as a total heat energy to be absorbed at the time of the melting of crystals in accordance with JIS K-7122 by the use of DSC-7 made by Perkin-Elmer Co., Ltd.

Furthermore, in the homopolymer of propylene and the propylene copolymer containing 4% by weight or less of the other olefin unit which are the components (a), a boiling n-heptane-soluble content is preferably in the range of 30 to 95% by weight. If this boiling n-heptane-soluble content is less than 30% by weight, the flexibility tends to be impaired, and if it is more than 95% by weight, there is a tendency that a sufficient mechanical strength cannot be obtained. From the viewpoints of balance between the flexibility and the mechanical strength, the more preferable boiling n-heptane-soluble content is in the range of 40 to 90% by weight. Here, the boiling n-heptane-soluble content is a value obtained by calculating a soluble content on the basis of a remaining unextracted content after extraction has been carried out for 6 hours with boiling n-heptane by the use of a Soxhlet's extractor for a test.

In the homopolymer of propylene and the propylene copolymer containing 4% by weight or less of the other olefin unit, carbons each having a methyl group as a side chain are not usually adjacently arranged in a propylene chain portion, and in other words, inversion bonds are not present. Hence, the carbons each having the methyl group are arranged in order every other carbon. In short, in the present invention, the respective propylene units are linked to each other by head-tail bonds, and neither head-head bonds nor tail-tail bonds are substantially present.

In the propylene copolymer containing 4% by weight or less of the other olefin unit, examples of an olefin as a comonomer which can be used to form the other olefin unit include α-olefins such as ethylene, 1-butene, 1-pentene, 4-methyl-1-pentene, 1-hexene, 1-heptene, 1-octene, 1-nonene and 1-decene. Above all, ethylene is suitable. These olefins may be used singly or in a combination of two or more thereof. The olefin as the comonomer is required to be used so that the content of the unit derived from the olefin in the obtained propylene copolymer may be 4% by weight or less.

In the composition of the present invention, a polypropylene resin comprising the resin of the above-mentioned component (a) and a propylene copolymer (b) containing 10 to 80% by weight of an olefin unit other than propylene can be used as the basic resin of the component (A). A preferable example of the propylene copolymer which is the component (b) is a random copolymer containing 10 to 80% by weight of an olefin unit other than propylene. Here, examples of the olefin as the comonomer which can form the olefin unit other than propylene include α-olefins such as ethylene, 1-butene, 1-pentene, 4-methyl-1-pentene, 1-hexene, 1-heptene, 1-octene, 1-nonene and 1-decene, and dienes such as butadiene, dicyclopentadiene and tricyclopentadiene. These olefins as the comonomers may be used singly or in a combination of two or more thereof.

In the present invention, in the case that the propylene copolymer which is the component (b) is used as the basic resin of the component (A), the content of the component (b) in the basic resin of the component (A) is 80% by weight or less. If this content is in excess of 80% by weight, calender moldability is poor, and films or sheets having desired physical properties cannot be obtained. From the viewpoints of the calender moldability and the physical properties of the obtained films or sheets, the content of the component (b) is preferably 80% by weight or less, particularly preferably 60% by weight or less.

In the composition of the present invention, a melt index (MI) of the polypropylene resin which can be used as the component (A) is preferably in the range of 0.1 to 50 g/10 min. If this MI is less than 0.1 g/10 min, molding is difficult, and if it is more than 50 g/10 min, the mechanical properties of the molded articles are insufficient. From the viewpoint of balance between the moldability and the mechanical properties of the molded articles, the MI is preferably in the range of 0.2 to 30 g/10 min. Incidentally, this MI is a value measured under a load of 2.16 kgf at a temperature of 230° C.

The polypropylene resin of the component (A) in the composition of the present invention can be prepared by, for example, a gaseous phase one-stage polymerization method, a slurry one-stage polymerization method, a gaseous phase multi-stage polymerization method, a slurry multi-stage polymerization method or a blend method.

For example, in the case of the preparation by the polymerization method, propylene can be homopolymerized, or propylene can be copolymerized with another olefin in the presence of a catalyst system comprising (W) a solid component comprising (i) a solid catalytic component comprising magnesium, titanium, a halogen atom and an electron donor, and if necessary, (ii) a crystalline polyolefin, (X) an organic aluminum compound, (Y) an alkoxy group-containing aromatic compound represented by the general formula (II)

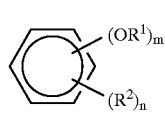
(II)

wherein $R^1$ is an alkyl group having 1 to 20 carbon atoms; $R^2$ is a hydrocarbon group having 1 to 10 carbon atoms, a hydroxyl group or a nitro group; m is an integer of 1 to 6; and n is an integer of 0 to (6-m), and if necessary, (Z) an electron donative compound.

The above-mentioned solid component (W) is constituted of (i) the solid catalytic component comprising magnesium, titanium, the halogen atom and the electron donor which is the component (i), and if necessary, the crystalline polyolefin which is the component (ii). The solid catalytic component which is the component (i) contains magnesium, titanium, the halogen atom and the electron donor as essential components, and it can be prepared by bringing a magnesium compound, a titanium compound and the electron donor into contact with one another. In this case, the halogen atom is contained as a halide in the magnesium compound and/or the titanium compound.

Examples of the magnesium compound include magnesium dihalides such as magnesium chloride, magnesium oxide, magnesium hydroxide, hydrotalcite, carboxylates of magnesium, alkoxymagnesiums such as diethoxymagnesium, alloyloxymagnesium, alkoxymagnesium halides, alloyloxymagnesium halides, alkylmagnesiums such as ethylbutylmagnesium, alkylmagnesium halides, organic magnesium compounds and electron donors, halosilanes, alkoxysilanes, and reaction products of silanols, aluminum compounds or the like. Above all, the magnesium halides, the alkoxymagnesiums, the alkylmagnesiums and the alkylmagnesium halides are preferable. These magnesium compounds may be used singly or in a combination of two or more thereof.

In addition, a reaction product of metallic magnesium, a halogen and an alcohol can also be used as the magnesium compound. No particular restriction is put on the kind of metallic magnesium which can be used in this case, and metallic magnesium having an optional particle diameter and an optional form such as granules, ribbons or powder is usable. Moreover, no particular restriction is put on the surface state of metallic magnesium, but it is preferred that a film such as magnesium oxide is not formed on the surface.

Furthermore, as the above-mentioned alcohol, an optional alcohol can be used, but it is preferable to use a lower alcohol having 1 to 6 carbon atoms, and ethanol is particularly preferable, because it can provide a solid catalytic component by which the expression of a catalytic performance can remarkably be improved. No particular restriction is put on the purity of the alcohol and a water content therein, but if the alcohol having the high water content is used, magnesium hydroxide is formed on the surface of metallic magnesium. Therefore, it is preferable to use the alcohol having a water content of 1% by weight or less, particularly 2000 ppm or less, and the lower the water content is, the more advantageous.

No particular restriction is put on the kind of halogen and/or halogen-containing compound, and as the halogen-containing compound, any compound containing a halogen atom in its molecule is usable. In this case, no particular restriction is put on the kind of halogen atom, but chlorine, bromine and iodine are preferable and iodine is particularly preferable. Among the halogen-containing compounds, halogen-containing metallic compounds are particularly preferable. Their state, shape and particle size are not particularly restrictive but optional, and for example, the halogen-containing compound can be used in the state of a solution in which it is dissolved in an alcohol solvent (e.g., ethanol).

The amount of the alcohol to be used is selected within the range of 2 to 100 mol, preferably 5 to 50 mol per mol of metallic magnesium. If the amount of the alcohol is too large, there is a tendency that the magnesium compound having a good morphology is scarcely obtained, and if it is too small, there is a fear that a reaction of the alcohol with metallic magnesium is not smoothly carried out.

The halogen and/or the halogen-containing compound is used in a ratio of 0.0001 gram atom or more, preferably 0.0005 gram atom or more, more preferably 0.001 gram atom or more in terms of a halogen atom to 1 gram atom of metallic magnesium. If the amount of the halogen and/or the halogen-containing compound is less than 0.0001 gram atom, an amount to be supported, an activity, a stereoregularity and the morphology of a produced polymer deteriorate when the obtained magnesium compound is used without grinding. Therefore, a grinding treatment is unpreferably indispensable. Furthermore, by suitably selecting the amount of the halogen and/or the halogen-containing compound, the particle size of the obtained magnesium compound can optionally be controlled.

The reaction itself of metallic magnesium, the alcohol and the halogen and/or the halogen-containing compound can be carried out by a known method. For example, a method can be utilized in which metallic magnesium, the alcohol and the halogen and/or the halogen-containing compound are usually reacted for about 20 to 30 hours under reflux until the generation of a hydrogen gas has not been observed any more to obtain the desired magnesium compound. Concretely, in the case that iodine is used as the halogen, there are a method which comprises pouring metallic magnesium and solid iodine into the alcohol, followed by heating and reflux, a method which comprises dropwise adding an alcohol solution of metallic magnesium and iodine to the alcohol, followed by heating and reflux, and a method which comprises dropwise adding an alcohol solution of iodine to an alcohol solution containing metallic magnesium while the latter solution is being heated. Any of these methods is preferably carried out under an inert gas atmosphere such as a nitrogen gas or an argon gas, if necessary, by the use of an inert organic solvent (e.g., a saturated hydrocarbon such as n-hexane). With regard to the addition of metallic magnesium, the alcohol and the halogen and/or the halogen-containing compound, the total amounts of these components may be added to a reactor at a first stage, or they may be divided and then separately added. According to a particularly preferable procedure, the total amount of the alcohol is first poured into the reactor, and metallic magnesium portions into which metallic magnesium has been divided are then separately added thereto.

According to this preferable procedure, the temporary generation of a large amount of a hydrogen gas can be prevented, which is very desirable from the viewpoint of safety. In addition, the reactor can be miniaturized. Moreover, the entrainment of the alcohol and the halogen and/or the halogen-containing compound which is caused by the temporary generation of the large hydrogen gas can also be prevented. The number of the metallic magnesium portions into which metallic magnesium should be divided can be decided in consideration of the scale of the reactor and the intricacy of the operation, but usually, the number of the divided metallic magnesium portions is preferably in the range of 5 to 10. Needless to say, the reaction itself may be carried out by either of a batch system and a continuous system. Furthermore, another different method can also be used which comprises first adding a small amount of metallic magnesium to the reactor into which all of the alcohol has previously been poured, separating and collecting a product obtained by the reaction in another tank, and then repeating the same operations of the addition of small metallic magnesium and the like as described above.

Before used in a subsequent step where the solid catalytic component is prepared, the thus obtained magnesium compound may be dried, or it may be filtered and then washed with an inert solvent such as heptane. In either case, the obtained magnesium compound can be used in the subsequent step without grinding or classification for uniforming a particle diameter.

Furthermore, examples of the above-mentioned titanium compound include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyltitanium and tetraphenoxytitanium, titanium tetrahalides such as titanium tetrachloride, titanium tetrabromide and titanium tetraiodide, halogenated alkoxytitaniums such as methoxytitanium trichloride, ethoxytitanium trichloride, propoxytitanium trichloride, n-butoxytitanium trichloride and ethoxytitanium tribromide, dihalogenated dialkoxytitaniums such as dimethoxytitanium dichloride, diethoxytitanium dichloride, dipropoxytitanium dichloride, di-n-butoxytitanium dichloride and diethoxytitanium dibromide, and monohalogenated trialkoxytitaniums such as trimethoxytitanium chloride, triethoxytitanium chloride, tripropoxytitanium chloride and tri-n-butoxytitanium chloride. Above all, a titanium compound having a high halogen content, particularly titanium tetrachloride is preferable. These titanium compounds may be used singly or in a combination of two or more thereof.

As the electron donor, there can be used compounds which will be mentioned hereinafter as the above-mentioned electron donative compound which is the component (Z).

The preparation of the solid catalytic component (i) can be carried out by any of known methods (e.g., Japanese Patent Application Laid-open Nos. 43094/1978, 135102/1980, 135103/1980, 18606/1981, 166205/1981, 63309/1982, 190004/1982, 300407/1982 and 47003/1083).

Usually, in the composition of the thus prepared solid catalytic component (i), a magnesium/titanium atom ratio is in the range of 2 to 100, a halogen/titanium atom ratio is in the range of 5 to 100, and an electron donor/titanium mol ratio is in the range of 0.1 to 10.

Furthermore, examples of the crystalline polyolefin as the component (ii) which can be used as needed in the preparation of the solid component (W) include crystalline polyolefins obtained from α-olefins having 2 to 10 carbon atoms such as polyethylene, polypropylene, polybutene and poly(4-methyl-1-pentene). This crystalline polyolefin can be obtained by (1) a method which comprises prepolymerizing an olefin in the presence of a combination of the above-mentioned solid catalytic component (i), the aluminum compound and if necessary, the electron donor (a prepolymerization method), (2) a method which comprises dispersing the above-mentioned solid catalytic component (i), and if necessary, the organic aluminum compound and the electron donative compound (having a melting point of 100° C. or more) in a crystalline powder of a crystalline polyethylene, polypropylene or the like having a uniform particle size (a dispersion method), or (3) a method which comprises the combination of the above-mentioned methods (1) and (2).

In the above-mentioned prepolymerization method (1), an aluminum/titanium atom ratio is usually selected within the range of 0.1 to 100, preferably 0.5 to 5, and a molar ratio of the electron donative compound/titanium is selected within the range of 0 to 50, preferably 0.1 to 2.

In the solid component (W), a ratio between the solid catalytic component (i) and the crystalline polyolefin (ii) is selected so that a weight ratio of the component (ii) to the component (i) may be usually in the range of 0.33 to 200, preferably 0.10 to 50.

Next, examples of the organic aluminum compound which can be used as the component (X) include compounds represented by the general formula (III)

$$AlR^3_p X_{3-p} \quad (III)$$

wherein $R^3$ is an alkyl group having 3 to 20 carbon atoms or an aryl group having 6 to 20 carbon atoms; X is a halogen atom; and p is an integer of 1 to 3.

Examples of the suitably usable compounds represented by the general formula (III) include trialkylaluminums such as triisopropylaluminum, triisobutylaluminum and trioctylaluminum, dialkylaluminum monohalides such as diethylaluminum monochloride, diisopropylaluminum monochloride, diisobutylaluminum monochloride and dioctylaluminum monochloride, and alkylaluminum sesquihalides such as ethylaluminum sesquichloride. These aluminum compounds may be used singly or in a combination of two or more thereof.

In the catalytic system in the present invention, an alkoxy group-containing aromatic compound represented by the following general formula (II) is used as the component (Y):

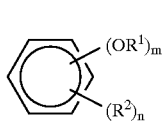

(II)

wherein $R^1$ is an alkyl group having 1 to 20 carbon atoms; $R^2$ is a hydrocarbon group having 1 to 10 carbon atoms, a hydroxyl group or a nitro group; m is an integer of 1 to 6; and n is an integer of 0 to (6-m).

Typical examples of the alkoxy group-containing aromatic compound include monoalkoxy compounds such as m-methoxytoluene, o-methoxyphenol, m-methoxyphenol, 2-methoxy-4-methylphenol, vinylanisole, p-(1-propenyl)-anisole, p-allylanisole, 1,3-bis(p-methoxyphenyl)-1-pentene, 5-allyl-2-methoxyphenol, 4-hydroxy-3-methoxybenzyl alcohol, methoxybenzyl alcohol, nitroanisole and nitrophenetole, dialkoxy compounds such as o-dimethoxybenzene, m-dimethoxybenzene, p-dimethoxybenzene, 3,4-dimethoxytoluene, 2,6-dimethoxyphenol and 1-allyl-3,4-dimethoxybenzene, and trialkoxy compounds such as 1,3,5-trimethoxybenzene, 5-allyl-1,2,3-trimethoxybenzene, 5-allyl-1,2,4-trimethoxybenzene, 1,2,3-trimethoxy-5-(1-propenyl)benzene, 1,2,4-trimethoxy-5-(1-propenyl)benzene, 1,2,3-trimethoxybenzene and 1,2,4-trimethoxybenzene. Above all, the dialkoxy compounds and the trialkoxy compounds are preferable. These alkoxy group-containing aromatic compounds may be used singly or in a combination of two or more thereof.

In the catalyst, the electron donative compound can be used as the component (Z), if necessary. This electron donative compound contains oxygen, nitrogen, phosphorus, sulfur, silicon or the like, and it basically has a function for improving regularity in the polymerization of propylene.

Examples of the electron donative compound include organic silicon compounds, esters, thioesters, amines, ketones, nitrites, phosphines, ethers, thioethers, acid anhydrides, acid halides, acid amides, aldehydes, organic acids and azo compounds.

Typical examples of the electron donative compound include organic silicon compounds such as diphenyldimethoxysilane, diphenyldiethoxysilane, dibenzyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane and benzyltrimethoxysilane, aromatic dicarboxylic acid esters such as monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl phthalate, monopropyl terephthalate, monobutyl terephthalate, monoisobutyl terephthalate, dimethyl phthalate, diethyl phthalate, dipropyl phthalate, dibutyl phthalate, diisobutyl phthalate, diamyl phthalate, diisoamyl phthalate, methylethyl phthalate, methylisobutyl phthalate, methylpropyl phthalate, ethylbutyl phthalate, ethylisobutyl phthalate, ethylpropyl phthalate, propylisobutyl phthalate, dimethyl terephthalate, diethyl phthalate, dipropyl terephthalate, diisobutyl terephthalate, methylethyl phthalate, methylisobutyl terephthalate, methylpropyl terephthalate, ethylbutyl terephthalate, ethylisobutyl terephthalate, ethylpropyl terephthalate, propylisobutyl terephthalate, dimethyl isophthalate, diethyl isophthalate, dipropyl isophthalate, diisobutyl isophthalate, methylethyl isophthalate, methylisobutyl isophthalate, methylpropyl isophthalate, ethylbutyl isophthalate, ethylisobutyl isophthalate, ethylpropyl isophthalate and propylisobutyl isophthalate, esters such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexacarbonate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, ethyl p-butoxybenzoate, ethyl o-chlorobenzoate and ethyl naphthoate, γ-butyrolactone, δ-valerolactone, coumarin, phthalide, esters such as ethylene carbonate, organic acids such as benzoic acid and p-oxybenzoic acid, acid anhydrides such as succinic anhydride, benzoic anhydride and p-toluylic anhydride, ketones such as acetone, methyl ethyl ketone, methyl isobutyl ketone, acetophenone, benzophenone and benzoquinone, aldehydes such as acetaldehyde, propionaldehyde, octylaldehyde, tolualdehyde, benzaldehyde and naphthylaldehyde, acid halides such as acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, cyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride and benzene-1,2,4-tricarbonyl trichloride, ethers such as methyl ether, ethyl ether, isopropyl ether, n-butyl ether, isopropyl methyl ether, isopropyl ethyl ether, t-butyl ethyl ether, t-butyl n-propyl ether, t-butyl n-butyl ether, t-amyl methyl ether, t-amyl ethyl ether, amyl ether, tetrahydrofuran, anisole, diphenyl ether and ethylene glycol butyl ether, acid amides such as acetic amide, benzoic amide and toluylic amide, amines such as tributylamine, N,N'-dimethylpiperazine, tribenzylamine, aniline, pyridine, pyrroline and tetramethylethylenediamine, nitriles such as acetonitrile, benzonitrile and tolunitrile, and azo compounds such as 2,2'-azobis(2-methylpropane), 2,2'-azobis(2-ethylpropane) and 2,2'-azobis(2-methylpentane) in which a steric hindrance substituent is linked with an azo bond.

Above all, the organic silicon compounds, the esters, the ketones, the ethers, the thioethers, the acid anhydrides and the acid halides are preferable, and organic silicon compounds such as diphenyldimethoxysilane and phenyltriethoxysilane, aromatic dicarboxylic acid diesters such as di-n-butyl phthalate and diisobutyl phthalate, and alkyl esters of aromatic monocarboxylic acids such as benzoic acid, p-methoxybenzoic acid, p-ethoxybenzoic acid and toluylic acid are particularly preferable. These electron donative compounds may be used singly or in a combination of two or more thereof.

With regard to amounts of the respective components to be used in the catalytic system, the solid component (W) is used in such an amount as to be usually in the range of 0.0005 to 1 mol in terms of a titanium atom per liter of a reaction volume. The organic aluminum compound (X) is used in such an amount that an aluminum/titanium atom ratio is usually in the range of 1 to 3000, preferably 40 to 800, and if the amount of the compound (X) deviates from the above-mentioned range, a catalytic activity tends to be poor. In addition, the alkoxy group-containing aromatic compound (Y) is used in such a ratio that a molar ratio of the compound (Y) to a titanium atom in the solid component (W) is usually in the range of 0.01 to 500, preferably 1 to 300. If the amount of the compound (Y) is less than 0.01, the physical properties of the produced polymer tend to deteriorate, and if it is more than 500, the catalytic activity tends to be poor.

In the present invention, when the homopolymer of propylene and/or the propylene copolymer containing 4% by weight or less of the other olefin unit which is the component (a) is used as the polypropylene resin which is the component (A), the resin of the component (a) can be prepared by homopolymerizing propylene or copolymerizing propylene with a small amount of the other olefin in the presence of the above-mentioned catalyst, for example, by the use of the one-stage polymerization method. Alternatively, when the polypropylene resin comprising the resin as the component (a) and the propylene copolymer as the component (b) is used, the resin as the component (a) can be prepared in the same manner as described above in the first polymerization (the first stage polymerization) of the multi-stage polymerization in the presence of the above-mentioned catalyst system, and the propylene copolymer as the component (b) can be prepared by copolymerizing propylene with the other olefin in the second or latter stage.

No particular restriction is put on a polymerization technique, and any of slurry polymerization, gaseous phase polymerization, bulk polymerization, solution polymerization and suspension polymerization can be used.

In the preparation or the preparation step of the resin as the component (a) in which the polymerization is carried out by the gaseous phase polymerization, polymerization pressure is suitably selected usually in the range of 10 to 45 kg/cm$^2$, preferably 20 to 30 kg/cm$^2$, and polymerization temperature is usually selected in the range of 40 to 90° C., preferably 60 to 75° C. Furthermore, in the preparation step of the propylene copolymer as the component (b), polymerization pressure is suitably selected usually in the range of 5 to 30 kg/cm$^2$, preferably 10 to 20 kg/cm$^2$, and polymerization temperature is suitably selected usually in the range of 20 to 90° C., preferably 40 to 60° C. In either step, the adjustment of the molecular weight of the polymer can be carried out by a known means, for example, by controlling a hydrogen concentration in a polymerizer. Alternatively, the adjustment of the molecular weight can also be achieved by obtaining a (co)polymer having a relatively high molecular weight in the polymerization process, and then melting and kneading the thus obtained (co)polymer in the presence of an organic peroxide. Polymerization time can suitably be selected in the range of about 5 minutes to 10 hours.

In carrying out the polymerization, the respective components constituting the catalyst system, i.e., the components (W) to (Z) may be mixed in a predetermined ratio to bring them into contact with one another, and the material monomer may immediately be fed to the catalyst system to start the polymerization. Alternatively, the catalyst system may be aged for about 0.2 to 3 hours after the aforesaid contact, and the material monomer may be fed thereto. Furthermore, these catalytic components can be suspended in an inert solvent or an olefin which is the material monomer, and the suspension can then be fed.

After the polymerization, a post-treatment can be carried out in a usual manner. That is to say, in the case of the gaseous phase polymerization method, a nitrogen gas stream may be introduced into a polymer powder taken out from the polymerizer after the polymerization in order to remove the unreacted monomer therefrom. Alternatively, the polymer may be pelletized by an extruder as needed, and in this case, for the purpose of completely inactivating the catalyst, a small amount of water or an alcohol can be added. In the case of the bulk polymerization method, the unreacted monomer may be separated from the polymer taken out from the polymerizer after the polymerization, and the polymer can then be pelletized.

Furthermore, when the polypropylene resin comprising the component (a) and the component (b) is used as the polypropylene resin of the component (A), the resin of the component (a) and the resin of the component (b) can separately be prepared, and these resins can be blended with each other in a predetermined ratio in a known manner (e.g., dry blending or kneading) to prepare the polypropylene resin.

In the composition of the present invention, as a component (B), there can be used at least one fatty acid derivative selected from the group consisting of octyltin salts of fatty acids, alkylenebisfatty acid amides, fatty acid esters of polyvalent alcohols and metal salts of aliphatic monocarboxylic acids.

As the above-mentioned octyltin salts of the fatty acids, there can be preferably used compounds represented by the general formula (I)

$$(C_8H_{17})_k Sn(OOC-R)_{4-k} \quad (I)$$

wherein R is an alkyl group or an alkenyl group having 9 to 21 carbon atoms; k is 1 or 2; and a plurality of R-COO- groups may be the same or different.

The alkyl group or the alkenyl group having 9 to 21 carbon atoms represented by R in this general formula (I) may take any of a straight-chain structure, a branched structure or a cyclic structure, and in addition, it may be substituted by a suitable substituent such as a hydroxyl group. Examples of the fatty acid which forms such octyltin salts of the fatty acids include 2-ethylhexylic acid, n-octylic acid, versatic acid, lauric acid, stearic acid, behenic acid, oleic acid and ricinoleic acid.

The alkylenebisfatty acid amide preferably contain a fatty acid having 10 to 22 carbon atoms, and examples of the preferable alkylenebisfatty acid amide include ethylenebisstearic acid amide and methylenebisstearic acid amide.

Furthermore, in the fatty acid ester of the polyvalent alcohol, all of the hydroxyl groups of the polyvalent alcohol may be esterified or may be partially esterified. No particular restriction is put on this polyvalent alcohol component for forming the ester, so far as it has two or more hydroxyl groups in one molecule, and so the various polyvalent alcohols can be used. Examples of the polyvalent alcohols include ethylene glycol, propylene glycol, neopentyl glycol, trimethylolethane, trimethylolpropane, glycerin, pentaerythritol, dipentaerythritol and sorbitol, and above all, pentaerythritol and dipentaerythritol are particularly suitable in view of an effect. On the other hand, the fatty acid which is the acid component for forming the ester may take any of a saturated structure or an unsaturated structure. In addition, the fatty acid has one carboxyl group or two or more carboxyl groups. Moreover, an acyl group of the fatty acid may be substituted by a suitable group such as a hydroxyl group. Examples of such a fatty acid include octylic acid, stearic acid, oleic acid, erucic acid, malonic acid, succinic acid, adipic acid, maleic acid, malic acid, tartaric acid and butanetetracarboxylic acid.

In the composition of the present invention, one or more of metal salts of aliphatic monocarboxylic acids can be used as the component (B).

As the metal salts of the aliphatic monocarboxylic acids, various metal salts can be used, but in the preferable metal salts of the aliphatic monocarboxylic acids, the metals constituting these metal salts are metals in the groups 1, 2 and 8 to 14 of the periodic table. Furthermore, in the preferable metal salts of the aliphatic monocarboxylic acids, the aliphatic monocarboxylic acids constituting these metal salts are saturated and unsaturated monocarboxylic acids having 8 to 32 carbon atoms which may contain functional groups.

Here, the metals in the group 1 of the periodic table are Li, Na and K; the metals in the group 2 are Mg, Ca, Ba and Sr; the metal in the group 8 is Fe; the metal in the group 9 is Co; the metal in the group 10 is Ni; the metal in the group 11 is Cu; the metals in the group 12 are Zn and Cd; the metal in the group 13 is Al; and the metals in the group 14 are Pb and Sn. Above all, Mg and Ca which are the metals in the group 2 as well as Zn which is the metal in the group 12 are preferable.

On the other hand, the preferable aliphatic monocarboxylic acids constituting the metal salts of the aliphatic monocarboxylic acids are saturated and unsaturated monocarboxylic acids having 8 to 32 carbon atoms as described above, particularly preferably 12 to 22 carbon atoms, and they may be synthetic or natural. In addition, these aliphatic monocarboxylic acids may contain functional groups such as a hydroxyl group, a ketone group (a carbonyl group), an aldehyde group and an epoxy group, and they may further have various kinds of side chains. Typical examples of the particularly preferable aliphatic monocarboxylic acids include lauric acid, myristic acid, palmitic acid, arachic acid, heptadecylic acid, behenic acid, oleic acid, elaidic acid, erucic acid, linoleic acid, linolenic acid, ricinoleic acid, hydroxystearic acid, montanic acid, isostearic acid and epoxystearic acid.

These fatty acid derivatives which can be used as the component (B) have a function as a lubricant and they may be used singly or in a combination of two or more thereof. The amount of the fatty acid derivative to be blended is required to be in the range of 0.01 to 5 parts by weight with respect to 100 parts by weight of the polypropylene resin as the component (A). If this amount is less than 0.01 part by weight, the effect of the added fatty acid derivative cannot sufficiently be exerted, calender moldability is poor and films or sheets having desired physical properties cannot be obtained. If it is more than 5 parts by weight, the fatty acid derivative bleeds to soil calender rolls, to whiten the surfaces of the films or sheets, and to deteriorate the mechanical properties of the molded articles. From the viewpoints of the calender moldability, the physical properties of the obtained films or sheets and the inhibition of the bleeding, the amount of the component (B) to be blended is in the range of 0.02 to 3 parts by weight, particularly preferably 0.05 to 2 parts by weight.

To the polypropylene resin composition of the present invention, various additives can be added as needed. Examples of the additives include a thermoplastic resin, a flexible elastomer, a modified polyolefin, a stabilizer, an inorganic or an organic filler, an anti-static agent, a chlorine capturer, an anti-blocking agent, an anti-fogging agent, an organic flame retardant, a flame retardant auxiliary, a dye, a pigment, a natural oil, a synthetic oil and a wax.

Examples of the thermoplastic resin include straight-chain ethylene-α-olefin copolymers such as low-density polyethylene obtained by a high-pressure method, ethylene-1-butene copolymer, ethylene-1-hexene copolymer and ethylene-1-octene copolymer, high-density polyethylene, polypropylene, propylene-olefin copolymers, polybutene, polyvinyl chloride, polystyrene, acrylic resin, ABS resin, polyamides, polyesters and polycarbonates.

Above all, polyolefin resins such as polyethylene, polypropylene and polybutene are preferable, and polyethylene and ethylene-α-olefin copolymers are particularly preferable.

Examples of the flexible elastomer include styrenic copolymer elastomers, α-olefin copolymer elastomers, ethylene-unsaturated carboxylic acid-α, β-unsaturated carboxylic acid ester copolymers and acrylonitrile copolymer elastomers. Examples of the modified polyolefin include modified polyolefins obtained by chemically modifying polyolefins such as polyethylene, polypropylene, ethylene-α-olefin copolymers, ethylene-α-olefin-nonconjugated diene compound copolymers (e.g., EPDM) and ethylene-aromatic monovinyl compound-conjugated diene compound copolymer rubbers with unsaturated carboxylic acids such as acrylic acid, methacrylic acid and maleic acid, an unsaturated carboxylic anhydride such as maleic anhydride, esters of unsaturated carboxylic acids such as methyl acrylate and monomethyl maleate, amides of unsaturated carboxylic acids such as aryclic amide and maleic acid monoamide, and imides of unsaturated carboxylic acids such as maleimide and N-butylmaleimide. As this chemical modification method, there can be used a method in which the polyolefin is reacted with the above-mentioned unsaturated carboxylic acid or its derivative in the presence of a radical generator such as benzoyl peroxide in a suitable solvent.

Examples of the above-mentioned stabilizer include a phenolic stabilizer, an organic phosphite stabilizer, a thioether stabilizer and a hindered amine stabilizer. Examples of the phenolic stabilizer include conventional known compounds, for example, 2,6-di-t-butyl-4-methylphenol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-2-ethyl-6-t-octylphenol, 2-isopropyl-4-ethyl-5-t-hexylphenol, 2-cyclohexyl-4-n-butyl-6-isopropylphenol, styrenated mixed cresol, dl-α-tocopherol, t-butyl-hydroquinone, 2,2'-methylenebis(4-methyl-6-t-butylphenol), 4,4'-butylidenebis(3-methyl-6-t-butylphenol), 4,4'-thio-bis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethyl-idenebis(4,6-di-t-butylphenol), 2,2'-butylidenebis(2-t-butyl-4-methylphenol), 1,1,3-tris(2-methyl-4-hydroxy-5-t-butylphenol)butane, triethylene glycol-bis[3-(3-t-butyl-5-methyl-4-hydroxyphenyl) propionate], 1,6-hexanediol-bis[3-(3,5-di-t-butyl-4-hydroxyphenyl) propionate], 2,2'-thiodiethylenebis[3-(3,5-di-t-butyl-4-hydroxyphenyl) propionate], N,N'-hexamethylenebis(3,5-di-t-4-hydroxy-hydrocinnamide), 3,5-di-t-butyl-4-hydroxybenzyl phosphonate-diethyl ester, 1,3,5-tris(2,6-dimethyl-3-hydroxy-4-t-butylbenzyl) isocyanurate, 1,3,5-tris[(3,5-di-t-butyl-4-hydroxyphenyl) propionyloxyethyl]isocyanurate, tris(4-t-butyl-2,6-dimethyl-3-hydroxybenzyl) isocyanurate, 2,4-bis(n-octylthio)-6-(4-hydroxy-3,5-di-t-butylanilino)-1,3,5-triazine, tetrakis[methylene-3-(3,5-di-t-butyl-4-hydroxyphenyl) propionate]methane, bis(ethyl 3,5-di-t-butyl-4-hydroxybenzylphosphonate)calcium, bis(ethyl 3,5-di-t-butyl-4-hydroxybenzylphosphonate)nickel, bis[3,3-bis (3-t-butyl-4-hydroxyphenyl)butylic acid] glycol ester, N,N'-bis[3-(3,5-di-t-butyl-4-hydroxyphenyl)propionyl]hydrazine, 2,2'-oxamido-bis[ethyl-3-(3,5-di-t-butyl-4-hydroxyphenyl) propionate], bis[2-t-butyl-4-methyl-6-(3-t-butyl-5-methyl-2-hydroxybenzyl)phenyl]terephthalate, 1,3,5-trimethyl-2,4, 6-tris(3,5-di-t-butyl-4-hydroxybenzyl)benzene, 3,9-bis[1,1-dimethyl-2-[β-(3-t-butyl-4-hydroxy-5-methylphenyl) propionyloxy]ethyl]-2,4,8,10-tetraoxaspriro[5,5]undecane, 2,2-bis[4-[2-(3,5-di-t-butyl-4-hydroxyhydroxycinnamoyloxy)]-ethoxyphenyl]propane and an alkyl β-(3,5-di-t-butyl-4-hydroxyphenyl)propionate such as stearyl β-(4-hydroxy-3,5-di-t-butylphenol) propionate. Above all, 2,6-di-t-butyl-4-methylphenol, stearyl β-(4-hydroxy-3,5-di-t-butylphenol)propionate, 2,2'-ethylidenebis(4,6-di-t-butylphenol) and tetrakis[methylene-3-(3,5-di-t-butyl-4-hydroxyphenyl) propionate]methane are suitable.

Examples of the organic phosphite stabilizer include trioctyl phosphite, trilauryl phosphite, tristridecyl phosphite, trisisodecyl phosphite, phenyldiisooctyl phosphite, phenyldiisodecyl phosphite, phenyldi(tridecyl) phosphite, diphenylisooctyl phosphite, diphenylisodecyl phosphite, diphenyltridecyl phosphite, triphenyl phosphite, tris(nonylphenyl) phosphite, tris(2,4-di-t-butylphenyl) phosphite, tris (butoxyethyl) phosphite, tetratridecyl-4,4'-butylidenebis(3-methyl-6-t-butylphenol) diphosphite, 4,4'-isopropylidene-diphenolalkyl phosphite (the alkyl has about 12 to 15 carbon atoms), 4,4'-isopropylidenebis(2-t-butylphenol).di (nonylphenyl)phosphite, tris(biphenyl) phosphite, tetra (tridecyl)-1,1,3-tris(2-tris(2-methyl-5-t-butyl-4-hydroxyphenyl)butane diphosphite, tris(3,5-di-t-butyl-4-hydroxyphenyl) phosphite, hydrogenated 4,4'-isopropylidenediphenol polyphosphite, bis(octylphenyl).bis [4,4'-butylidenebis(3-methyl-6-t-butylphenol)].1,6-hexanediol diphosphite, hexatridecyl-1,1,3-tris(2-methyl-4-hydroxy-5-t-butylphenol) diphosphite, tris[4,4'-idopropylidenebis(2-t-butylphenol)] phosphite, tris(1,3-distearoyloxyisopropyl) phosphite, 9,10-dihydro-9-phosphaphenanthrene-10-oxide, tetrakis(2,4-di-t-butylphenyl)-4,4'-biphenylene diphosphonite, distearylpentaerythritol diphosphite, di(nonylphenyl) pentaerythritol diphosphite, phenyl.4,4'-isopropylidenediphenol.pentaerythritol diphosphite, bis(2,4-di-t-butylphenyl)pentaerythritol diphosphite, bis(2,6-di-t-butyl-4-methylphenyl)pentaerythritol diphosphite and phenylbisphenol A-pentaerythritol diphosphite. Above all, tris(2,4-di-t-butylphenyl) phosphite, tris(nonylphenyl) phosphite and tetrakis(2,4-di-t-butylphenyl)-4,4'-biphenylene diphosphite are preparable, and tris(2,4-di-t-butylphenyl) phosphite is particularly suitable.

Furthermore, as the organic thioether stabilizer, there can preferably be used dialkyl thiodipropionates and esters of polyvalent alcohols and alkylthiopropionic acids. As the dialkyl thiodipropionates which can be used herein, the dialkyl thiodipropionates having an alkyl group of 6 to 20 carbon atoms are preferable, and as the esters of the polyvalent alcohols and the alkylthiopropionic acids, the esters of the polyvalent alcohols and the alkylthiopropionic acids having an alkyl group of 4 to 20 carbon atoms are preferable. In this case, examples of the polyvalent alcohols which constitute the polyvalent alcohol esters include glycerin, trimethylolethane, trimethylolpropane, pentaerythritol and trishydroxyethylisocyanurate.

Examples of the dialkyl thiodipropionates include dilauryl thiodipropionate, dimyristyl thiodipropionate and distearyl thiodipropionate. On the other hand, examples of the esters of the polyvalent alcohols and the alkylthiopropionic acids include glycerol tributyl thiopropionate, glycerol trioctyl thiopropionate, glycerol trilauryl thiopropionate, glycerol tristearyl thiopropionate, trimethylol ethanetributyl thiopropionate, trimethylol ethanetrioctyl thiopropionate, trimethylol ethanetrilauryl thiopropionate, trimethylol ethanetristearyl thiopropionate, pentaerythritol tetrabutyl thiopropionate, pentaerythritol tetraoctyl thiopropionate, pentaerythritol tetralauryl thiopropionate and pentaerythritol tetrastearyl thiopropionate. Above all, dilauryl thiodipropionate, distearyl thiodipropionate and pentaerythritol tetrastearyl thiopropionate are suitable.

Examples of the above-mentioned hindered amine stabilizer include bis(2,2,6,6-tetramethyl-4-piperidyl) sebacate, dimethyl succinate-1-(2-hydroxyethyl)-4-hydroxy-2,2,6,6-tetramethylpiperidine polycondensate, poly[6-(1,1,3,3-tetramethylbutyl)imino-1,3,5-triazine-2,4-diyl][(2,2,6,6-tetramethyl-4-piperidyl)imino]hexamethylene[2,2,6,6-tetramethyl-4-piperidyl)imino], tetrakis(2,2,-6,6-tetramethyl-4-piperidyl)-1,2,3,4-butanetetracarboxylate, 2,2,6,6-tetramethyl-4-piperidyl benzoate, bis(1,2,6,6-pentamethyl-4-piperidyl)-2-(3,5-di-t-butyl-4-hydroxybenzyl)-2-n-butyl malonate, bis(N-methyl-2,2,6,6-tetramethyl-4-piperidyl) sebacate, 1,1'-(1,2-ethanediyl)bis(3,3,5,5-tetramethylpiperazinone), (mixed 2,2,6,6-tetramethyl-4-piperidyl/tridecyl)-1,2,3,4-butanetetracarboxylate, (mixed 1,2,2,6,6-pentamethyl-4-piperidyl/tridecyl)-1,2,3,4-butane-tetracarboxylate, mixed [2,2,6,6-tetramethyl-4-piperidyl/β,β,β', β'-tetramethyl-3,9-[2,4,8,10-tetraoxaspriro(5,5)-undecane]diethyl-1,2,3,4-butanetetracarboxylate, mixed [1,2,2,6,6-pentamethyl-4-piperidyl/β,β,β',β'-tetramethyl-3,9-[2,4,8,10-tetraoxaspriro(5,5)undecane]diethyl-1,2,3,4-butanetetracarboxylate, N,N'-bis(3-aminopropyl)ethylenediamine-2,4-bis[N-butyl-N-(1,2,2,6,6-pentamethyl-4-piperidyl)amino]-6-chloro-1,3,5-triazine condensate, poly[6-N-morpholyl-1,3,5-triazine-2,4-diyl][(2,2,6,6-tetramethyl-4-piperidyl)imino]hexamethylene[(2,2,6,6-tetramethyl-4-piperidyl)imide], condensate of N,N'-bis(2,2,6,6-tetramethyl-4-piperidyl)hexamethylenediamine and 1,2-dibromoethane and [N-(2,2,6,6-tetramethyl-4-piperidyl)-2-methyl-2-(2,2,6,6-tetramethyl-4-piperidyl)imino]propionamide.

Among these hindered amine stabilizers, particularly suitable are dimethyl succinate-1-(2-hydroxyethyl)-4-hydroxy-2,2,6,6-tetramethylpiperidine polycondensate, poly[6-(1,1,3,3-tetramethylbutyl)imino-1,3,5-triazine-2,4-diyl]-[(2,2,6,6-tetramethyl-4-piperidyl)imino]hexamethylene-[2,2,6,6-tetramethyl-4-piperidyl)imino], tetrakis(2,2,6,6-tetramethyl-4-piperidyl)-1,2,3,4-butanetetracarboxylate, bis(1,2,6,6-pentamethyl-4-piperidyl)-2-(3,5-di-t-butyl-4-hydroxybenzyl)-2-n-butyl malonate, 1,1'-(1,2-ethanediyl)-bis(3,3,5,5-tetramethylpiperazinone), (mixed 2,2,6,6-tetramethyl-4-piperidyl/tridecyl)-1,2,3,4-butanetetracarboxylate, (mixed 1,2,2,6,6-pentamethyl-4-piperidyl/tridecyl)-1,2,3,4-butanetetracarboxylate, mixed [2,2,6,6-tetramethyl-4-piperidyl/β,β,β',β'-tetramethyl-3,9-[2,4,8,10-tetraoxaspriro(5,5)undecane]diethyl-1,2,3,4-butanetetracarboxylate, mixed [1,2,2,6,6-pentamethyl-4-piperidyl/β,β,β',β'-tetramethyl-3,9-[2,4,8,10-tetraoxaspriro(5,5)undecane]diethyl-1,2,3,4-butanetetracarboxylate, N,N'-bis(3-aminopropyl)ethylenediamine-2,4-bis[N-butyl-N-(1,2,2,6,6-pentamethyl-4-piperidyl)amino]-6-chloro-1,3,5-triazine condensate, poly[6-N-morpholyl-1,3,5-triazine-2,4-diyl]-[(2,2,6,6-tetramethyl-4-piperidyl)imino]hexamethylene-[(2,2,6,6-tetramethyl-4-piperidyl)imide], condensate of N,N'-bis(2,2,6,6-tetramethyl-4-piperidyl)hexamethylenediamine and 1,2-dibromoethane and [N-(2,2,6,6-tetramethyl-4-piperidyl)-2-methyl-2-(2,2,6,6-tetramethyl-4-piperidyl)imino]propionamide.

Examples of the above-mentioned inorganic filler include spherical fillers, plane fillers, fibrous fillers and inorganic flame retardants. Examples of the spherical fillers include calcium carbonate, kaolin (aluminum silicate), silica, perlite, sirasu balloon, sericite, diatomaceous earth, calcium sulfite, calcined alumina, calcium silicate, crystalline zeolite and amorphous zeolite. Examples of the plane fillers include talc and mica, and examples of the fibrous fillers include a needle filler such as wollastonite and fibrous fillers such as magnesium oxysulfate, potassium titanate fiber and fibrous calcium carbonate, and completely fibrous fillers such as glass fibers. Examples of the inorganic flame retardants include hydrated aluminum, hydrated gypsum, zinc borate, barium borate, borax, kaolin, clay, calcium carbonate, alunite, basic magnesium carbonate, calcium hydroxide and magnesium hydroxide.

On the other hand, examples of the organic filler include woody particles such as wood powder and cotton powder, chaff powder, crosslinked rubber powder, plastic powder and collagen powder.

No particular restriction is put on a process for preparing the polypropylene resin composition of the present invention, and a conventional known process can be used. For example, a polypropylene resin as the component (A) is blended with a fatty acid derivative as the component (B) and if necessary, various additive components, and the blend is then mixed by a tumbler blender or a Henschel mixer. After the mixing, the mixture may be molten, kneaded and then granulated by the use of a single screw extruder or a multiple screw extruder, or by the use of a kneader or a Banbury mixer, thereby preparing the polypropylene resin composition.

The thus prepared polypropylene resin composition of the present invention can preferably be used for the manufacture of films and sheets by calender molding. In this molding, conventional and known calender molding machines such as a serial type, an L type, a reverse L type and a Z type can be employed. With regard to molding conditions in this case, a resin temperature is usually in the range of 170 to 300° C., preferably 180 to 270° C., and a roll temperature is in the range of 130 to 300° C., preferably 150 to 270° C. If desired, in a molding step, papers or cloths can be fed to rolls to manufacture artificial leathers, waterproof cloths or various laminated products.

The polypropylene resin composition of the present invention permits, under a good moldability by the calender molding machine, the manufacture of the films and sheets having less thickness unevenness, excellent appearance and heat resistance and such flexibility as in molded articles of a plastic polyvinyl chloride.

The films and sheets obtained by the calender molding of the polypropylene resin composition of the present invention are useful as, for example, civil engineering construction materials and automobile interior covering materials.

Next, the present invention will be described in more detail with reference to examples, but the scope of the present invention should not be limited at all by these examples.

Incidentally, the physical properties of polypropylene resins were measured in accordance with procedures described hereinbefore in this specification.

PREPARATION EXAMPLE 1

(1) Preparation of Magnesium Compound

An about 6-liter glass reactor equipped with a stirrer was sufficiently purged with a nitrogen gas, and about 2,430 g of ethanol, 16 g of iodine and 160 g of metallic magnesium were then placed in the reactor. Next, these materials were heated with stirring, and reaction was carried out under reflux until the generation of a hydrogen gas had not been observed any more from the reaction system, thereby obtaining a solid reaction product. The resulting reaction solution containing this solid reaction product is dried under reduced pressure to obtain the desired magnesium compound.

(2) Preparation of Solid Catalytic Component (W)

In a 5-liter glass reactor sufficiently purged with a nitrogen gas were placed 160 g of the magnesium compound (not ground) obtained in the above-mentioned (1), 800 ml of purified heptane, 24 ml of silicon tetrachloride and 23 ml of diethyl phthalate. Next, the system was maintained at 80° C., and 770 ml of titanium tetrachloride was added with stirring. After reaction at 110° C. for 2 hours, the resulting solid component was separated and then washed with purified heptane at 90° C. Afterward, 1,220 ml of titanium tetrachloride was added, and reaction was then done at 110° C. for 2 hours. Next, the resulting reaction product was sufficiently washed with purified heptane to obtain the desired solid catalytic component (W).

(3) Gaseous Phase Polymerization

To a 200-liter polymerizer, the solid catalytic component (W) obtained in the above-mentioned (2), triisobutylaluminum (TIBA), 1-allyl-3,4-dimethoxybenzene (ADMB), diphenyldimethoxysilane (DPDMS) and propylene were fed at feed rates of 6.0 g/hr, 0.2 mol/hr, 0.012 mol/hr, 0.005 mol/hr and 37 kg/hr, respectively, and polymerization was then carried out at 70° C. under 28 kg/cm$^2$G.

The intrinsic viscosity [η] (in decalin at 135° C.) of the resulting polymer was 4.27 dl/g. In this case, the production of the polymer in the polymerizer was 30 kg/hr. In the polymer, a boiling n-heptane-insoluble content is 60.0% by weight.

In a pentad fraction by $^{13}$C-NMR of the obtained polymer, [rrrr/(1-mmmm)]×100 was 34.5%. In this polymer, a melt peak temperature (Tm) measured by DSC was 158° C. and a melt enthalpy (ΔH) was 54 J/g. Furthermore, any inversion bonds were not present.

In the polymer, [η] of a boiling n-heptane-insoluble component was 4.76 dl/g, and [η] of a boiling n-heptane-soluble component was 2.65 dl/g.

The thus obtained polypropylene powder was mixed with 2,5-dimethyl-2,5-di-(t-butylperoxy)hexane, and an antioxidant, a heat stabilizer and a chlorine capturer were then added. Afterward, the mixture was extruded by an extruder having a diameter of 40 mm to obtain pellets having a melt index (MI) of 2.5 g/10 min. These pellets were named A-1.

The above-mentioned polymer was decomposed with a peroxide to lower the molecular weight of the polymer, but in this polymer having a low molecular weight, the pentad fraction, the melt peak temperature and the melt enthalpy described above did not change.

PREPARATION EXAMPLE 2

All the same procedure as in Preparation Example 1 was repeated to carry out (1) the preparation of a magnesium compound, (2) the preparation of a solid catalytic component, and (3) gaseous phase polymerization.

Next, the resulting polymer was continuously delivered to a polymerizer in the latter step. Ethylene and propylene were fed to the polymerizer in the latter step at feed rates of 15 kg/hr and 5 kg/hr, respectively, and polymerization was then done at 50° C. under 15 kg/cm$^2$G to obtain a polymer having a total intrinsic viscosity [η] of 4.77 dl/g and an ethylene unit content of 16.5% by weight, and a reaction ratio in the latter step was 37.5%.

The resulting powder was mixed with 2,5-dimethyl-2,5-di-(t-butylperoxy)hexane, and an antioxidant, a stabilizer and a chlorine capturer were added and then mixed. Afterward, the mixture was extruded by an extruder having a diameter of 40 mm to obtain pellets having an MI of 2.5 g/10 min. These pellets were named A-2.

EXAMPLES 1 TO 9 AND COMPARATIVE EXAMPLES 1 to 7

0.5 part by weight of each of lubricants [components (B)] shown in Table 1 was added to 100 parts by weight of the polymer pellets A-1 obtained in Preparation Example 1 or the polymer pellets A-2 obtained in Preparation Example 2 to prepare a polypropylene resin composition. Next, this composition was passed between test rolls having a diameter of 6 inches heated to 180° C. to roll the same so that the thickness of a sheet might be about 0.3 mm, thereby forming the sheet.

Next, roll releasability and roll contamination at the time of this working as well as the state of the obtained sheets (surface smoothness) were observed, and they were evaluated on the basis of the following ranking. Furthermore, each of the obtained sheets was cut into 5×5 cm$^2$, and this sample was allowed to stand for 3 days in a constant temperature and constant humidity chamber at 60° C. and 90%. Afterward, the surface appearance (discharge properties) of each sample was visually observed and then evaluated on the basis of the following ranking.

The results of these items are shown in Table 1.

Ranking of Evaluation (1) Roll Releasability

⊚: The adhesion of the polymer to the rolls was not observed at all.

○: The adhesion of the polymer to the rolls was scarcely observed, and the polymer was sufficiently applicable to the rolling.

Δ: The adhesion of the polymer to the rolls was slightly observed, but the polymer was applicable to the rolling.

X: The early releasability was good, but the adhesion gradually increased and the operation was difficult.

XX: From an early stage, the adhesion was too high to do the operation.

(Δ and higher levels were successful.)

(2) Roll Contamination

⊚: Any plate-out was not observed on the surfaces of the rolls.

○: The plate-out was scarcely observed on the surfaces of the rolls.

Δ: The plate-out was slightly observed on the surfaces of the rolls, but any problem was not present.

X: The plate-out appeared on the surfaces of the rolls in the form of strips.

XX: The plate-out appeared all over the surfaces of the rolls.

(Δ and higher levels were successful.)

(3) Sheet state ⊙: The surface state on the sheet was smooth. ○: The surface state on the sheet was nearly smooth.

Δ: The surface state on the sheet was slightly rough, but it was acceptable.

X: The formation of the sheet was possible, but the surface state was very rough.

XX: Even the sampling of the sheet was impossible.

(Δ and higher levels were successful.)

(4) Discharge properties (blooming or bleeding properties) ⊙: The discharge of the lubricant was not observed at all. ○: The discharge of the lubricant was scarcely observed. Δ: The discharge of the lubricant was slightly observed, but the sheet was acceptable.

X: The discharge of the lubricant was clearly observed on the sheet surface.

XX: The lubricant was discharged all over the sheet surface, and whitening was observed.

(Δ and higher levels were successful.)

TABLE 1

|  | Component (B) (Lubricant) | | |
|---|---|---|---|
|  | Resin | Kind | Compound Name |
| (I) | | | |
| Example 1 | A-2 | Fatty acid ester | Glycerin monostearate |
| Example 2 | A-2 | Fatty acid ester | Pentaerythritol tetrastearate |
| Example 3 | A-1 | Fatty acid ester | Partial ester of mixed acids of adipic acid of dipentaerythritol and stearic acid |
| Example 4 | A-2 | Fatty acid ester | Dipentaerythritol stearate |
| Example 5 | A-2 | Tin-containing lubricant | Octyltin laurate |
| Example 6 | A-2 | Tin-containing lubricant | Octyltin stearate |
| Example 7 | A-2 | Tin-containing lubricant | Octyltin behenate |
| Example 8 | A-1 | Fatty acid amide | Ethylenebisstearic acid amide |
| Example 9 | A-1 | Fatty acid amide | Methylenebisstearic acid amide |
| (II) | | | |
| Comp. Ex. 1 | A-2 | — | — |
| Comp. Ex. 2 | A-1 | — | — |
| Comp. Ex. 3 | A-2 | Fatty acid | Stearic acid |
| Comp. Ex. 4 | A-2 | Hydrocarbone | Polyethylene wax |
| Comp. Ex. 5 | A-2 | Fatty acid ester | Stearyl stearate |
| Comp. Ex. 6 | A-2 | Fatty acid alcohol | Stearyl alcohol |
| Comp. Ex. 7 | A-1 | Fatty acid amide | Erucic acid amide |

|  | Evaluation | | | |
|---|---|---|---|---|
|  | Releasability from Rolls | Contamination of Rolls | State of Sheets | Discharge Properties |
| (III) | | | | |
| Example 1 | ○ | ○ | ○ | Δ |
| Example 2 | ○ | ○ | Δ | ○ |
| Example 3 | ⊙ | ○ | ○ | ○ |
| Example 4 | ⊙ | ○ | ○ | ○ |
| Example 5 | ⊙ | ○ | ○ | ○ |

TABLE 1-continued

| Example 6 | ○ | ○ | ○ | ○ |
| Example 7 | ○ | ○ | ○ | ○ |
| Example 8 | ⊙ | Δ | ○ | ○ |
| Example 9 | ⊙ | Δ | ○ | ○ |
| (IV) | | | | |
| Comp. Ex. 1 | XX | ⊙ | Δ | ⊙ |
| Comp. Ex. 2 | X | ⊙ | Δ | ⊙ |
| Comp. Ex. 3 | X | ⊙ | Δ | X |
| Comp. Ex. 4 | XX | ⊙ | Δ | ○ |
| Comp. Ex. 5 | X | ⊙ | ○ | Δ |
| Comp. Ex. 6 | Δ | Δ | X | Δ |
| Comp. Ex. 7 | ⊙ | ○ | ○ | X |

EXAMPLES 10 TO 20

The same procedure as in Example 1 was repeated except that each of lubricants (components B) shown in Table 2 was added, thereby preparing polypropylene resins, and these resins were then molded to form sheets. Afterward, with regard to the same items as in Example 1, evaluation was made. The results are shown in Table 2.

TABLE 2

|  | Component (B) (Lubricant) | | |
|---|---|---|---|
|  | Resin | Kind | Compound Name |
| (I) | | | |
| Example 10 | A-2 | Metallic soap | Zinc oleate |
| Example 11 | A-2 | Metallic soap | Zinc 12-hydroxystearate |
| Example 12 | A-2 | Metallic soap | Zinc stearate |
| Example 13 | A-2 | Metallic soap | Zinc behenate |
| Example 14 | A-2 | Metallic soap | Calcium stearate |
| Example 15 | A-2 | Metallic soap | Aluminum stearate |
| Example 16 | A-2 | Metallic soap | Lithium stearate |
| Example 17 | A-2 | Metallic soap | Magnesium stearate |
| Example 18 | A-2 | Metallic soap | Calcium oleate |
| Example 19 | A-1 | Metallic soap | Zinc oleate |
| Example 20 | A-1 | Metallic soap | Zinc Erucate |

|  | Evaluation | | | |
|---|---|---|---|---|
|  | Releasability from Rolls | Contamination of Rolls | State of Sheets | Discharge Properties |
| (II) | | | | |
| Example 10 | ⊙ | ⊙ | ⊙ | ⊙ |
| Example 11 | ⊙ | Δ | ○ | Δ |
| Example 12 | ⊙ | ○ | ⊙ | Δ |
| Example 13 | ⊙ | ○ | ○ | Δ |
| Example 14 | ○ | Δ | ○ | ○ |
| Example 15 | ○ | ○ | ○ | ○ |
| Example 16 | ○ | ⊙ | ○ | ○ |
| Example 17 | ○ | Δ | ○ | ○ |
| Example 18 | ○ | ○ | ○ | ⊙ |
| Example 19 | ⊙ | ⊙ | ○ | ⊙ |
| Example 20 | ⊙ | ⊙ | ⊙ | ⊙ |

What is claimed is:

1. A polypropylene resin composition consisting essentially of a composition which is obtained by blending (A) 100 parts by weight of a polypropylene resin consisting essentially of (a) 100 to 20% by weight of a homopolymer of propylene and/or a propylene copolymer containing 4% by weight or less of another olefin unit in which (i) in a pentad fraction by an isotope carbon nuclear magnetic resonance spectrum ($^{13}$C-NMR), [rrrr/(1-mmmm)]×100 is in the range of 20 to 60%, (ii) a melt peak temperature (Tm) measured by a differential scanning calorimeter (DSC) is 150° C. or more, and (iii) a melt enthalpy (ΔH) measured by DSC is 100 J/g or less, and (b) 0 to 80% by weight of a propylene copolymer containing 10 to 80% by weight of an olefin unit other than propylene, with (B) 0.01 to 5 parts by weight of at least one member selected from the group consisting of octyltin salts of fatty acids, alkylenebisfatty acid amides, fatty acid esters of polyvalent alcohols, and metal salts of aliphatic monocarboxylic acids.

2. The polypropylene resin composition according to claim 1 wherein the octyltin salt of the fatty acid which is the component (B) is a compound represented by the general formula (I)

$$(C_8H_{17})_k Sn(OOC-R)_{4-k} \qquad (I)$$

wherein R is an alkyl group or an alkenyl group having 9 to 21 carbon atoms; k is 1 or 2; and a plurality of R-COO- groups may be the same or different.

3. The polypropylene resin composition according to claim 1 wherein the alkylenebisfatty acid amide which is the component (B) is ethylenebisstearic acid amide or methylenebisstearic acid amide.

4. The polypropylene resin composition according to claim 1 wherein the fatty acid ester of the polyvalent alcohol which is the component (B) is a complete or a partial ester of the fatty acid and pentaerythritol, or a complete or a partial ester of the fatty acid and dipentaerythritol.

5. The polypropylene resin composition according to claim 1 wherein one or more metal salts of the aliphatic monocarboxylic acids which are the components (B) are blended.

6. The polypropylene resin composition according to claim 5 wherein a metal constituting the metal salt of the aliphatic monocarboxylic acid which is the component (B) is a metal in any group of the groups 1, 2 and 8 to 14 of the periodic table.

7. The polypropylene resin composition according to claim 5 wherein an aliphatic monocarboxylic acid constituting the metal salt of the aliphatic monocarboxylic acid which is the component (B) is a saturated or an unsaturated monocarboxylic acid having 8 to 32 carbon atoms which may contain a functional group.

8. The polypropylene resin composition according to claim 6 or 7 wherein the metal constituting the metal salt of the aliphatic monocarboxylic acid which is the component (B) is selected from the group consisting of Li, Na, K, Cu, Mg, Ca, Ba, Sr, Zn, Cd, Al, Pd, Sn, Fe, Co and Ni, and the aliphatic monocarboxylic acid constituting the metal salt of the aliphatic monocarboxylic acid is selected from the group consisting of lauric acid, myristic acid, palmitic acid, arachic acid, heptadecylic acid, behenic acid, oleic acid, elaidic acid, erucic acid, linoleic acid, linolenic acid, ricinoleic acid, hydroxystearic acid, montanic acid, isostearic acid and epoxystearic acid.

9. A resin composition for calender molding which comprises the resin composition described in claim 1.

* * * * *